Patented Jan. 1, 1924.

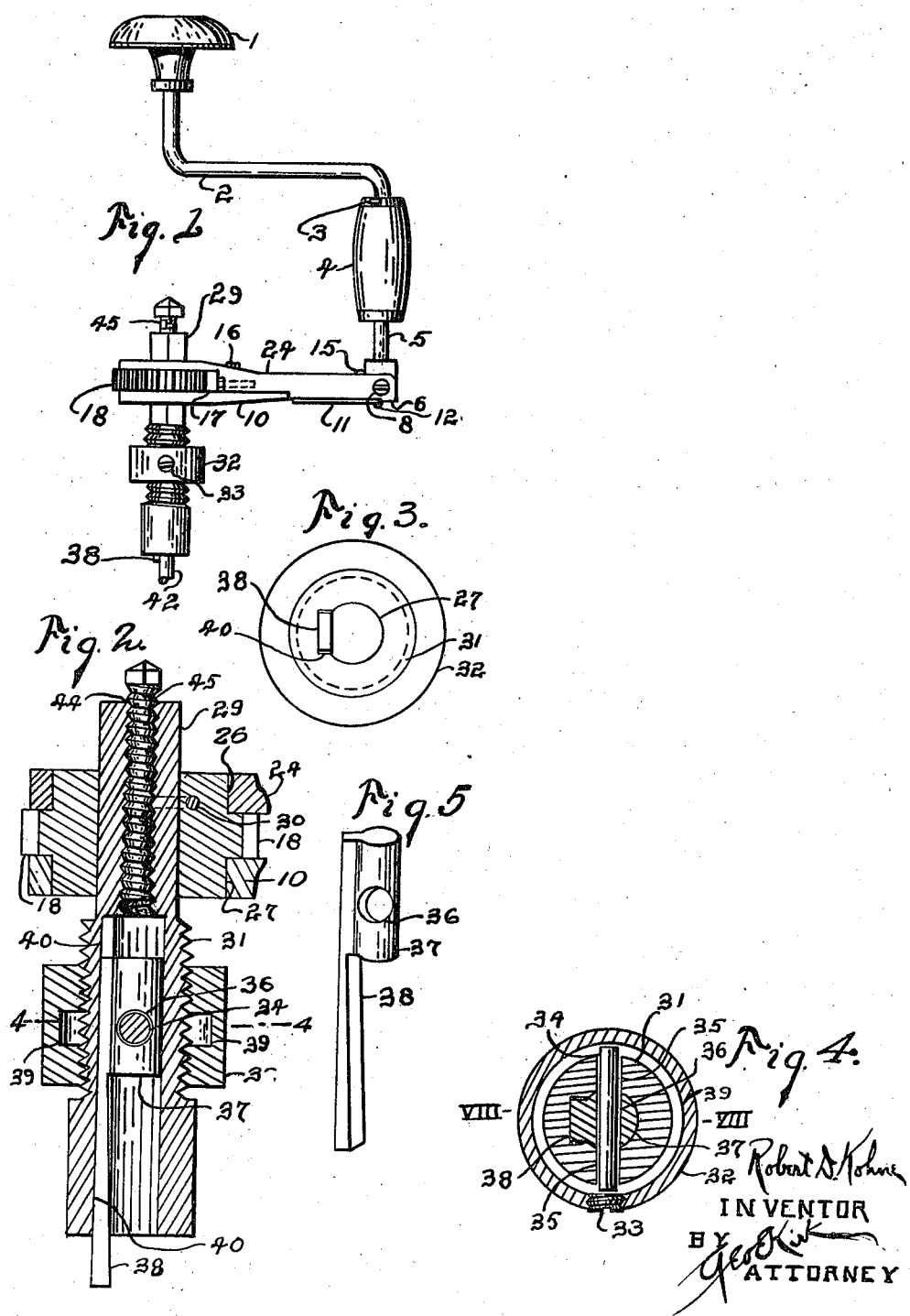

1,479,045

UNITED STATES PATENT OFFICE.

ROBERT D. KOHNE, OF TOLEDO, OHIO.

HAND TOOL.

Application filed March 14, 1921. Serial No. 451,993.

*To all whom it may concern:*

Be it known that I, ROBERT D. KOHNE, a citizen of the United States of America, residing at Toledo, Lucas County, Ohio, have invented new and useful Hand Tools, of which the following is a specification.

This invention relates to tool holding and operating devices.

This invention has utility when incorporated in bit and drill hand tools.

Referring to the drawings:

Fig. 1 is a side elevation of an embodiment of the invention in the form of a brace;

Fig. 2 is a view, with parts broken away of the tool holding stem or clutch;

Fig. 3 is a bottom plan of the stem of Fig. 2;

Fig. 4 is a section on the line 4—4, Fig. 2; and

Fig. 5 is a detail view of the adjustable spline for the chuck.

The device is shown as comprising a handle 1 mounted on arm 2, to which, by spring dog 3, is connected handle 4 on stem 5 which ends in a head 6 engaged by bolt 8 to connect arm element 10 therewith. Strap spring 11 terminating in beads 12 holds the handle 4 in brace position. Pin 15 may be depressed to release the handle 4. Bolts 16 mount a pair of dogs 17 adjacent ratchet 18. A second arm element 24 is assembled with the element 10.

The ratchet 18, has an upper cylindrical bearing extension 26 engaged by the element 24, while an opposite cylindrical bearing extension 27 from below the ratchet 18 is engaged by the element 10. The ratchet 18 has formed therethrough a square hole in which may be inserted, and thus keyed to rotate therewith, a square stem 29. Pin 30 assembles the stem 29 with the ratchet 18. Adjacent the portion 27, the member 29 has a somewhat larger threaded portion 31 upon which is mounted a nut 32. This nut 32 has an opening in which may be inserted a closure screw 33. Upon removal of this closure screw 33 pin 34 may be inserted to pass through opposing slots 35 in the threaded portion 31 and to pass through opening 36 in head 37 of tapered spline 38. The ends of the pin 34 in this position extend into groove 39 in the nut 32˙ so that rotation of this nut embracing the threaded portion 31 may shift the pin 34 axially of the stem 29, and simultaneously positively move the spline 38. When this operation of the nut 32 is in a direction to draw the spline 38 into the stem 29, the movement of the spline 38 in the way 40 throws this spline 38 to engage shank 42 of tool or drill 43. There is accordingly provided a simple device for positively locking a tool in a driving and holding stem.

The rotation of the nut 32 in the opposite direction may release the spline from holding position as to the shank and simultaneously serve as a positive ejection device for the tool. The stem 29 has in its upper section a threaded opening 44 in which may be inserted a threaded pin 45, the rotation of which pin outward from the stem 29 against a bracket (old man) or other holding means, may cause this to operate as a feeding device for the tool.

This mechanism is one having a compact simple chuck with a ratchet brace or driving arm readily convertible, giving this, as a tool, desirable features of utility.

What is claimed and it is desired to secure by United States Letters Patent is:—

1. A tool holder shaft provided with an external noncircular portion for effecting engagement thereof for driving rotation, and a concentric socket for directly receiving a cylindrical shank of a tool having a flat side, said socket being provided with a key way opposing said flat side, a spline having a head, located inwardly of the tool shank, and means exterior of the holder shaft rotatable as to the shaft for adjusting the head and for bringing the spline into binding engagement with the flat side of the tool shank.

2. In a tool holder, a shaft having a socket for directly engaging a tool shank for coaxial rotation with said shaft, said socket having a spline way, a spline having a head registering in said socket, ring means rotatable exteriorly of the shaft, and a pin coacting with the spline head and the ring means for shifting the spline whereby a tool shank may be held directly against said shaft in said socket.

3. A mounting for a tool embodying a wedge spline provided with a head, said spline tapering to have its thicker wedge portion away from the head, a socket having a spline way in which said head serves to position the spline by the head registering with said socket, said head having a way therethrough, a pin in said way protruding exteriorly of the socket, said socket being externally threaded, and a ring on said threaded portion of the socket and having an annular groove for receiving the protruding portions of the pin, whereby the ring may rotate independently of the pin, but in the travel of the ring axially of the socket may engage the pin and thereby effect shifting of the spline into or out of anchoring position with a tool in the socket.

In witness whereof I affix my signature.

ROBERT D. KOHNE.